United States Patent
Mattes et al.

[11] Patent Number: 6,141,604
[45] Date of Patent: Oct. 31, 2000

[54] METHOD AND ARRANGEMENT FOR DETECTING A VEHICLE ROLL-OVER

[75] Inventors: Bernhard Mattes, Sachsenheim; Walter Seyfang, Freiberg/Neckar; Michael Henne, Zaberfeld, all of Germany

[73] Assignee: Robert Bosch GmbH, Stuttgart, Germany

[21] Appl. No.: 09/142,615

[22] PCT Filed: Oct. 10, 1996

[86] PCT No.: PCT/DE96/01997

§ 371 Date: Apr. 16, 1999

§ 102(e) Date: Apr. 16, 1999

[87] PCT Pub. No.: WO97/33774

PCT Pub. Date: Sep. 18, 1997

[30] Foreign Application Priority Data

Mar. 11, 1996 [DE] Germany .................. 196 09 176

[51] Int. Cl.[7] .................. G06F 17/00; G06F 7/00
[52] U.S. Cl. .................. 701/1; 701/36; 701/38
[58] Field of Search .................. 701/1, 36, 37, 701/38, 39, 45; 180/282; 280/5.507, 756, 735, 730, 734; 73/514.02, 514.35, 510

[56] References Cited

U.S. PATENT DOCUMENTS

| | | | |
|---|---|---|---|
| 4,219,940 | 9/1980 | Okubo | 73/514.02 |
| 4,908,767 | 3/1990 | Scholl et al. | 701/220 |
| 5,890,084 | 3/1999 | Halasz et al. | 701/45 |
| 5,922,039 | 7/1999 | Welch et al. | 701/116 |

FOREIGN PATENT DOCUMENTS

| | | |
|---|---|---|
| 364 965 | 4/1990 | European Pat. Off. |
| 430 813 | 6/1991 | European Pat. Off. |
| 662 601 | 7/1995 | European Pat. Off. |
| 709 255 | 5/1996 | European Pat. Off. |
| 36 04 216 | 8/1987 | Germany. |
| 38 25 088 | 2/1990 | Germany. |
| 528 514 | 2/1993 | Germany. |
| 06 160525 | 6/1994 | Japan. |

Primary Examiner—Jacques H. Louis-Jacques
Attorney, Agent, or Firm—Kenyon & Kenyon

[57] ABSTRACT

In order to allow a vehicle rollover to be detected in timely fashion and with high reliability, acceleration sensors are provided which measure the accelerations of the vehicle in the direction of its yaw axis, its roll axis, and its pitch axis. In addition, at least one rotation rate sensor is provided which measures the angular velocity of the vehicle with respect to its roll axis and optionally also with respect to its pitch axis.

8 Claims, 3 Drawing Sheets

METHOD AND ARRANGEMENT FOR DETECTING A VEHICLE ROLL-OVER

FIELD OF THE INVENTION

If a vehicle rollover occurs, all the occupant protection mechanisms installed in the vehicle must be activated in timely fashion; these include, for example, rollover bars, belt tensioners, front and side airbags, fold-down seat locks in a commercial vehicle, etc. In order for all these safety devices to be activated in timely fashion, it is necessary to detect, as early as possible, whether vehicle accelerations in the direction of its vertical axis (yaw axis), longitudinal axis (roll axis), and transverse axis (pitch axis) will lead to a rollover. To ensure also that the occupant protection mechanisms are in fact activated only in the event of a rollover, incorrect detections of rollovers should be excluded to the greatest extent possible.

BACKGROUND OF THE INVENTION

German Patent No. 36 04 216 describes discloses a rollover sensor consisting of a fluid-filled space in which a body, suspended in the manner of a pendulum, is located as a seismic mass. By means of an electrical analysis circuit, changes in the position of the pendulum, which can deflect in any direction, yield information as to whether or not the vehicle is rolling over. This rollover sensor based on the pendulum principle has the disadvantage that it reacts too slowly to vehicle movements, so that a rollover might possibly be signaled too late to activate the occupant protection mechanisms.

European Patent No. 430 813 describes a safety system for a vehicle which extends a rollover bar in the event of a vehicle rollover. In order to be able to sense a rollover event, the system possesses acceleration sensors to measure the accelerations of the vehicle in the directions of its yaw axis, its roll axis, and its pitch axis, and it has at least one rotation rate sensor which measures the angular velocity of the vehicle (FZ) with respect to its roll axis.

SUMMARY OF THE INVENTION

An object of the present invention is to provide a method and an arrangement for detecting a vehicle rollover, with which a rollover can be detected in timely fashion and with high reliability.

An arrangement for detecting a vehicle rollover comprises multiple acceleration sensors which measure the accelerations of the vehicle in the directions of its yaw axis, its roll axis, and its yaw axis; and at least one rotation rate sensor which measures the angular velocity of the vehicle with respect to its roll axis and optionally also with respect to its pitch axis.

Also provided are means which calculate an acceleration vector from the three measured acceleration values and, if the angular offset of the acceleration vector from the acceleration vector of gravity when the vehicle is in the rest position exceeds a definable limit value, signal a rollover, such that the means define a limit value which is lower, the greater the angular velocity measured by the rotation rate sensor.

The following process steps are performed in order to detect a vehicle rollover: The accelerations of the vehicle in the directions of its yaw axis, its roll axis, and its pitch axis are measured with the acceleration sensors. An acceleration vector is then calculated from the three measured acceleration values. If the angular offset of the acceleration vector from the acceleration vector when the vehicle is in the rest position exceeds a definable limit value, a rollover is signaled. The limit value defined for the angular offset of the acceleration sensor is lower, the greater the angular velocity, with respect to the roll axis and optionally also with respect to the pitch axis, measured by at least one rotation rate sensor.

If no readings from the acceleration sensors are available, the angular velocity measured by the rotation rate sensor can be used as the sole criterion for detecting a rollover.

BRIEF DESCRIPTION OF THE DRAWINGS

FIG. 1 schematically depicts a vehicle FZ and an orthogonal axis system pertaining thereto, having a yaw axis z, a roll axis x, and a pitch axis y. Three acceleration sensors are installed in vehicle FZ. First acceleration sensor Bz measures the acceleration of the vehicle in the direction of yaw axis z, second acceleration sensor Bx measures acceleration in the direction of roll axis x, and third acceleration sensor By measures acceleration in the direction of pitch axis y. In order to be able to measure all three acceleration components, it is not absolutely necessary to provide three separate acceleration sensors. If all three acceleration components can be measured by a suitable arrangement of fewer than three acceleration sensors, the use of other acceleration sensor systems is also possible. At least one rotation rate sensor DRSx, which measures the angular velocity of the vehicle about roll axis X, is also installed in the vehicle. In addition, a second rotation rate sensor DRSy, which measures the angular velocity of the vehicle about pitch axis y, can also be provided. Since vehicle rollovers generally take place about roll axis x, second rotation rate sensor DRSy can optionally be omitted.

FIG. 3 depicts a process sequence according to which, from the readings of acceleration sensors Bz, Bx, By and the at least one rotation rate sensor DRSx, information is derived as to whether or not a vehicle rollover is occurring. In step 1, the acceleration of the vehicle in the x, y, and z directions is measured by means of acceleration sensors Bz, Bx, By. From these acceleration components, in step 2 a resultant acceleration vector B1 is calculated which has a specific direction and specific length.

FIG. 2 depicts a three-axis (x, y, z) projection diagram in which the calculated resultant acceleration vector B1 is plotted. Acceleration vector B0 lying in the z axis is the acceleration of gravity that is measured with acceleration sensors Bz, Bx, and By when the vehicle itself is exhibiting no inertial accelerations, i.e. is at a standstill or is moving uniformly. If the vehicle then experiences an inertial acceleration, acceleration vector B0 is pivoted (e.g. B1) out of its rest position (B0). A cone with enveloping surface M drawn in FIG. 2, whose vertex lies at the center of the coordinate system and whose rotation axis is the z axis, delimits the region for deflection of the acceleration vector in which the vehicle is in a stable position. A vehicle rollover may be expected only if acceleration vector B1, as sketched in FIG. 2, pivots beyond enveloping surface M of the cone.

Figure 1:
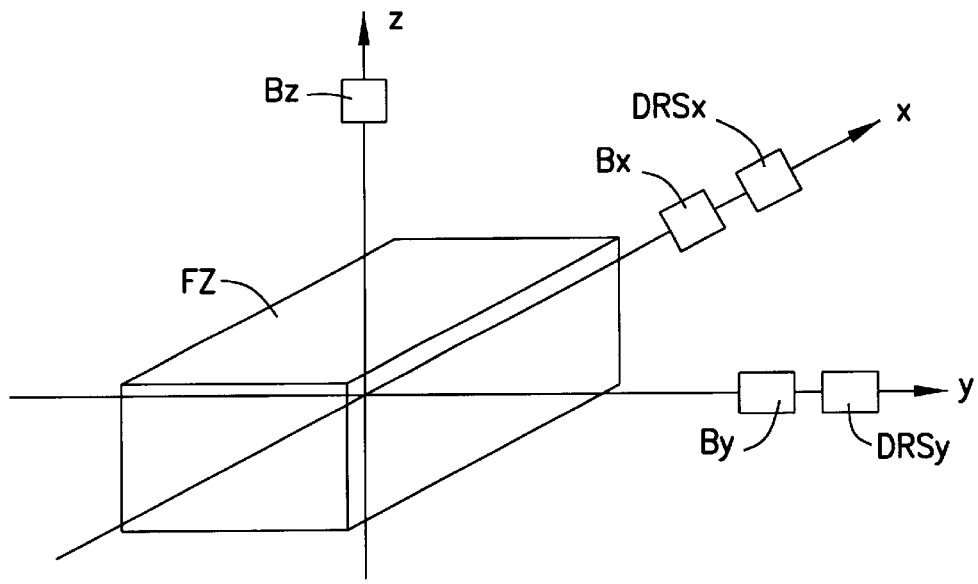
FIG. 1 shows a schematic depiction of a vehicle, with its three axes and acceleration sensors and rotation rate sensors.
Figure 2:
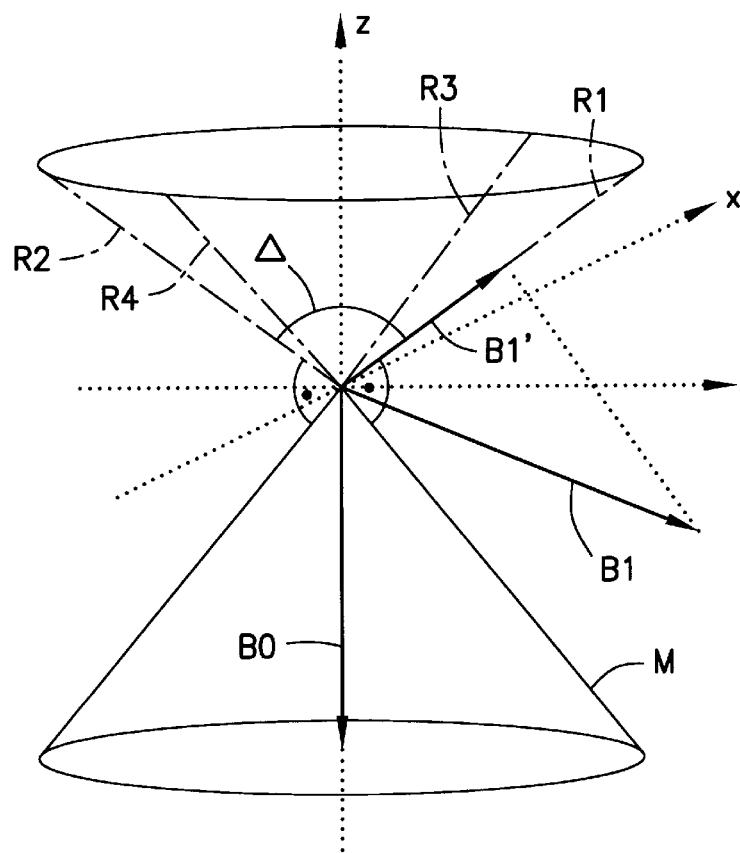
FIG. 2 shows a projection cone for the acceleration vector.
Figure 3A:
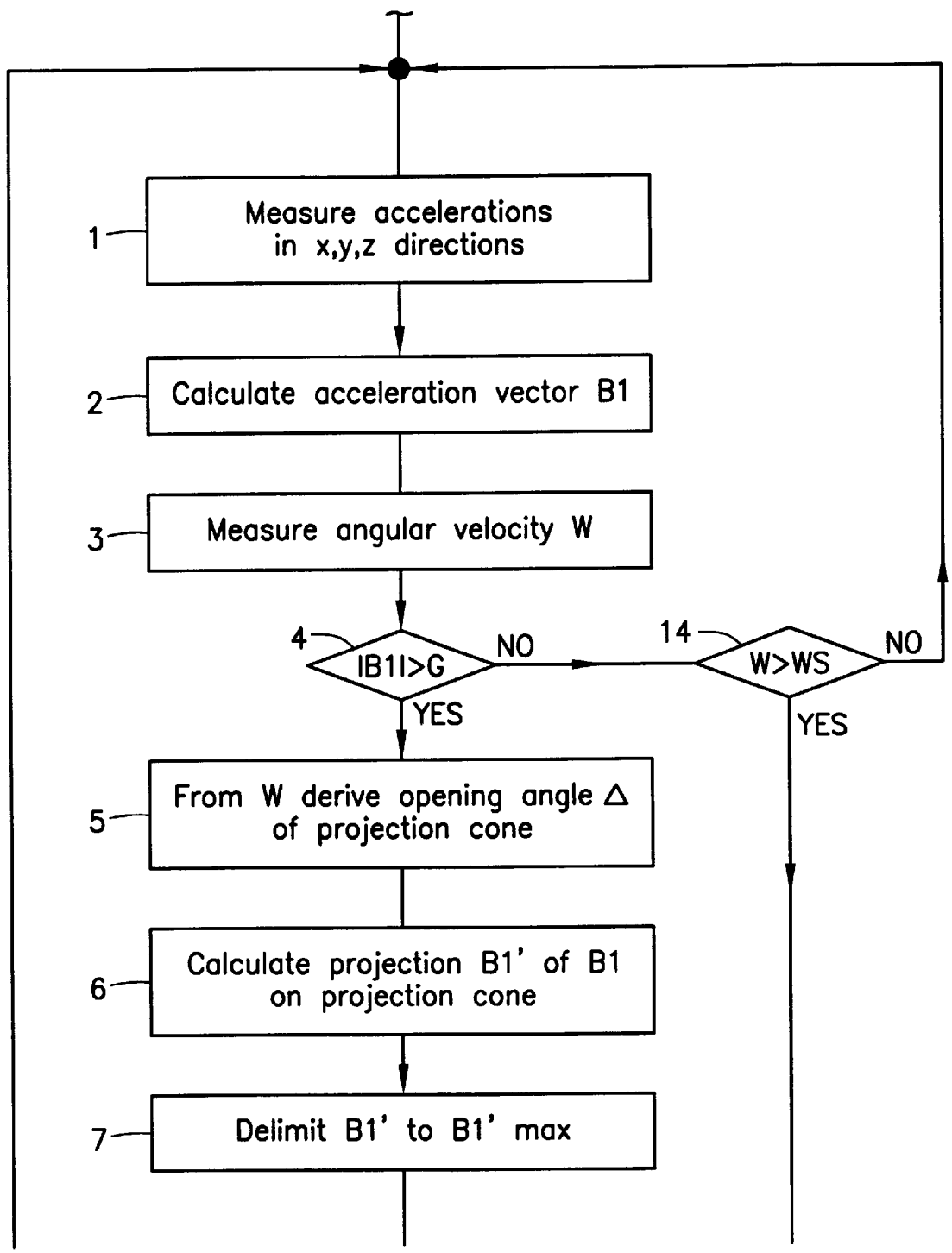
FIG. 3 shows a flow chart for a method according to the present invention.
Figure 3B:
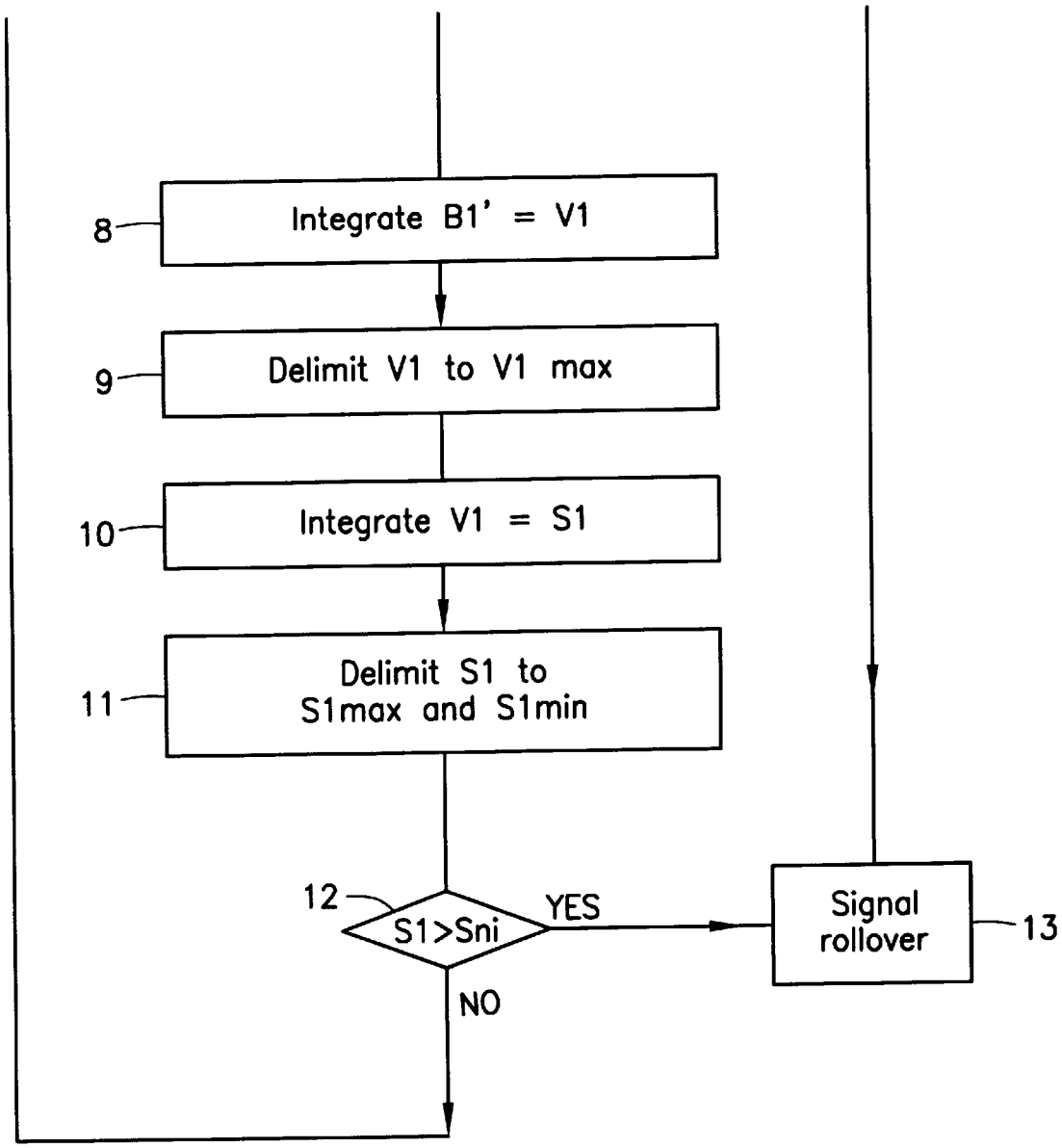

In addition to the acceleration components, the angular velocity W of the vehicle about an axis (preferably roll axis x) is also measured by at least one rotation rate sensor (step 3). If it is found in step 4 that the magnitude of the resultant acceleration vector |B1|>G (G being in the range from 0 to, for example, 0.05 times the acceleration of gravity g), in the next step 5 an opening angle Δ for a projection cone plotted in FIG. 2 is derived from the measured angular acceleration W. The projection cone constitutes an auxiliary means for deriving rollover information. Its rotation axis is also the z axis, its vertex also lies at the center of the coordinate system, and its enveloping surface is oriented orthogonally with respect to enveloping surface M of the cone which delimits the stable range of the vehicle.

The greater the angular velocity W measured in step 3, the smaller the opening angle of the cone with enveloping surface M that delimits the stable range of the vehicle must be, and the greater the opening angle Δ of the projection cone must become. The reason is that at a high angular velocity W, a vehicle rollover may be expected even at a smaller deflection angle for acceleration vector B1. The correlation between angular velocity W and opening angle Δ of the projection cone must therefore be determined empirically.

In step 6, the projection of acceleration vector B1 onto the projection cone is calculated; specifically, the projections of acceleration vector B1 in several directions R1, R2, R3, R4 are calculated. In FIG. 2, only one projection B1' in direction R1 is depicted as an example. For calculating rollover information, only this projection B1', i.e. the component of acceleration vector B1 that is perpendicular to enveloping surface M of the cone delimiting the stable range of the vehicle, is authoritative. The component of acceleration vector B1 lying in enveloping surface M of the cone has no influence on vehicle rollover. In the remaining steps, only projection B1' of acceleration vector B1 will therefore be processed to yield the rollover information.

In step 7, projection B1 is delimited to a maximum value B1' max. This delimitation is performed because extremely high accelerations which exceed the value B1' max do not lead to a vehicle rollover. Such acceleration influences may occurs, for example, when driving over a curb or an abrupt discontinuity in the road surface. Without the aforesaid delimitation, the system would predict a rollover on the basis of the very high acceleration, even though a rollover is not in fact occurring.

In the next process step 8, the delimited projection B1' of acceleration vector B1 is integrated, yielding a velocity V1. In step 9, this velocity V1 is also delimited to a maximum value V1max, for the same reasons as with acceleration B1' in step 7. In step 10, velocity V1 is then integrated to yield a distance S1. In step 11, this distance S1, like velocity V1 and acceleration B1' previously, is also delimited to a maximum value S1max. In addition, distance Si is delimited to a minimum valve S1min (e.g. zero). If distance S1 exceeds an empirically determined length Sn1 (step 12), a rollover is signaled (step 13). If, however, distance S1 remains below length Sn1, the entire procedure described above is executed again.

As already mentioned, the projections of acceleration vector B1 in multiple directions R1, R2, R3, R4 are considered, and a distance is derived from all of them. As soon as only one of said determined distances exceeds a limit value Sni (where i=1, 2, 3, . . . ), a rollover is signaled, resulting in activation of the safety mechanisms.

If the vehicle lifts off and loses contact with the ground, and if a rollover should thereby occur, acceleration sensors Bz, Bx, By would nevertheless measure only very small accelerations. In this case, following step 4, a query would be made in step 14 as to whether the measured angular velocity W is greater than a defined and empirically determined threshold WS. If such is actually the case, it is then assumed that a vehicle rollover is occurring. A rollover is thus signaled (step 13). If, on the other hand, the measured angular velocity W remains below threshold WS, the procedure begins afresh.

What is claimed is:

1. A method for detecting a rollover of a vehicle, comprising the steps of:
    measuring a first acceleration value of the vehicle in a first direction of a yaw axis using a first acceleration sensor;
    measuring a second acceleration value of the vehicle in a second direction of a roll axis using a second acceleration sensor;
    measuring a third acceleration value of the vehicle in a third direction of a pitch axis using a third acceleration sensor;
    determining a first acceleration vector as a function of the first, second and third acceleration values;
    determining a value of an angular offset of the first acceleration vector from a second acceleration vector of gravity when the vehicle is in a rest position;
    if the angular offset value is greater than a limit value, signaling the rollover; and
    measuring an angular velocity of the vehicle with respect to the roll axis using at least one rotation rate sensor;
    wherein the angular velocity and the limit value are inversely related.

2. The method according to claim 1, further comprising the step of:
    when the angular velocity with respect to the roll axis and to the pitch axis is increasing, decreasing the limit value.

3. The method according to claim 1, further comprising the step of:
    if the first, second and third acceleration values are unavailable, detecting the rollover as a function of the angular velocity.

4. The method according to claim 1, further comprising the steps of:
    determining projection values of the first acceleration vector in a respective protectional direction;
    integrating twice each of the projection values to determine a respective twice-integrated projection value; and
    if one of the twice-integrated projection values is greater than a direction-dependent threshold value, signaling the rollover.

5. The method according to claim 4, wherein the projection values are predetermined to limit the first, second and third acceleration values, and wherein an acceleration of the vehicle leading to the rollover is not present above the first, second and third acceleration values.

6. The method according to claim 4, wherein signals resulting from at least one of a first integration of the projection values and a second integration of the projection values are set to predetermined values above which the rollover does not occur.

7. A system for detecting a rollover of a vehicle comprising:
    a first acceleration sensor measuring a first acceleration value of the vehicle in a first direction of a yaw axis;
    a second acceleration sensor measuring a second acceleration value of the vehicle in a second direction of a roll axis;

a third acceleration sensor measuring a third acceleration value of the vehicle in a third direction of a pitch axis;

at least one rotation rate sensor measuring an angular velocity of the vehicle with respect to the roll axis; and an arrangement determining a first acceleration vector as a function of the first, second and third acceleration values, the arrangement determining a value of an angular offset of the first acceleration vector from a second acceleration vector of gravity when the vehicle is in a rest position, the arrangement signaling the rollover if the angular offset value is greater than a limit value, the arrangement defining the limit value such that the angular velocity and the limit value are inversely related.

8. The system according to claim 7, wherein the at least one rotation rate sensor measures the angular velocity with respect to the roll axis and to the pitch axis.

* * * * *

UNITED STATES PATENT AND TRADEMARK OFFICE
CERTIFICATE OF CORRECTION

| | | |
|---|---|---|
| PATENT NO. | : 6,141,604 | Page 1 of 1 |
| DATED | : October 31, 2000 | |
| INVENTOR(S) | : Mattes et al. | |

It is certified that error appears in the above-identified patent and that said Letters Patent is hereby corrected as shown below:

Column 1,
Line 3, insert -- This application is a 371 of PCT/DE96/01997 filed on October 10, 1996 --.
Line 5, insert paragraph -- The present invention relates to a method and an apparatus for detecting a vehicle rollover.

BACKGROUND OF THE INVENTION --.

Column 1,
Line 19, delete "BACKGROUND OF THE INVENTION".
Line 21, delete "... discloses ...".

Column 2,
Between lines 17 and 18, insert -- DETAILED DESCRIPTION OF THE INVENTION --.

Column 3,
Line 34, change "... B1 ..." to -- B1' --.

Signed and Sealed this

Twentieth Day of November, 2001

Attest:

*Nicholas P. Godici*

*Attesting Officer*

NICHOLAS P. GODICI
*Acting Director of the United States Patent and Trademark Office*